US010966012B2

(12) United States Patent
Lindén et al.

(10) Patent No.: US 10,966,012 B2
(45) Date of Patent: Mar. 30, 2021

(54) WIRELESS EARBUDS, AND A STORAGE AND CHARGING CAPSULE THEREFOR

(71) Applicant: EARIN AB, Malmö (SE)

(72) Inventors: Olle Lindén, Höllviken (SE); Kiril Trajkovski, Klagshamn (SE); Peter Rechnagel Kristensen, Copenhagen (DK); Scott Vance, Lewisburg, PA (US); Peder Sandberg, Lund (SE); Kim Kristensen, Borup (DK); Per Sennström, Malmö (SE); Göran Schack, Täby (SE)

(73) Assignee: EARIN AB, Malmö (SE)

( * ) Notice: Subject to any disclaimer, the term of this patent is extended or adjusted under 35 U.S.C. 154(b) by 0 days.

(21) Appl. No.: 16/475,744

(22) PCT Filed: Jan. 3, 2018

(86) PCT No.: PCT/SE2018/050003
§ 371 (c)(1),
(2) Date: Jul. 3, 2019

(87) PCT Pub. No.: WO2018/128577
PCT Pub. Date: Jul. 12, 2018

(65) Prior Publication Data
US 2019/0327550 A1 Oct. 24, 2019

(30) Foreign Application Priority Data

Jan. 3, 2017 (SE) ........................ 1750002
Jan. 5, 2017 (SE) ........................ 1750004
Jan. 5, 2017 (SE) ........................ 1750005

(51) Int. Cl.
*H04R 1/10* (2006.01)
*H04R 11/02* (2006.01)
*H02J 7/00* (2006.01)

(52) U.S. Cl.
CPC .......... *H04R 1/1025* (2013.01); *H02J 7/0044* (2013.01); *H04R 1/1016* (2013.01); *H04R 11/02* (2013.01)

(58) Field of Classification Search
CPC ........ H02J 7/0047; H02J 7/0048; H02J 7/342; H04R 1/1025; H04R 1/1016; H04R 11/02;
(Continued)

(56) References Cited

U.S. PATENT DOCUMENTS 6,661,901 B1 * 12/2003 Svean .................... A61F 11/08
381/328
9,516,442 B1 * 12/2016 Dusan .................... H04R 1/222
(Continued)

FOREIGN PATENT DOCUMENTS

EP    1640972 A1    3/2006
EP    3151584 A2    4/2017
(Continued)

OTHER PUBLICATIONS

Motorola, Motorola_HINT_2014, 2014, pp. 1-12.*
(Continued)

*Primary Examiner* — Brian Ensey
(74) *Attorney, Agent, or Firm* — Sandberg Phoenix & von Gontard, P.C.

(57) ABSTRACT

A wireless earbud (100) for in-ear use has an earbud housing (110), a loudspeaker (130), a rechargeable battery (140), a first microphone (132) and a second microphone (134). The first microphone (132) is adapted to pick up sound internally from an ear canal of a user wearing the wireless earbud. The second microphone (134) is adapted to pick up sound externally from outside of the ear canal of the user wearing the wireless earbud. Disclosed is also a storage and charging capsule (200) for at least one wireless earbud (100*a*, 100*b*).

(Continued)

The capsule has an elongate insert part (240) having an earbud chamber (246) adapted to receive the or each wireless earbud (100a, 100b). A cover part (260) slidably receives the elongate insert part (240) and is placeable in an open position in which the cover part is retracted from the elongate insert part to allow insertion/removal of the or each wireless earbud (100a, 100b) into/from the earbud chamber (246) of the elongate insert part (240). The cover part is also placeable in a closed position in which it encapsulates the elongate insert part. The storage and charging capsule (200) further has a power source (270), and a magnetic connector interface (257) in the earbud chamber (246) of the elongate insert part (240). The magnetic connector interface (257) is connected to the power source (270) and is adapted to engage with a respective at least one charge pad (101) of the earbud (100a, 100b) so as to secure the earbud (100a, 100b) in the earbud chamber and allow charging thereof by the power source (270).

25 Claims, 13 Drawing Sheets

(58) Field of Classification Search
CPC .... H04R 1/1058; H04R 1/1083; H04R 5/033; H04R 2420/07; H04R 2460/01; H04R 25/02
See application file for complete search history.

(56) References Cited

U.S. PATENT DOCUMENTS

| | | | |
|---|---|---|---|
| 2012/0114154 A1 | 5/2012 | Abrahamsson | |
| 2013/0148839 A1 | 6/2013 | Stevinson | |
| 2013/0188816 A1 | 7/2013 | Bouse | |
| 2013/0265702 A1 | 10/2013 | Merenda | |
| 2014/0376763 A1 | 12/2014 | Stevinson | |
| 2015/0200558 A1 | 7/2015 | Castillo et al. | |
| 2015/0245127 A1* | 8/2015 | Shaffer | H04R 1/1025 381/380 |
| 2016/0073188 A1 | 3/2016 | Lindén et al. | |
| 2016/0073189 A1 | 3/2016 | Lindén et al. | |
| 2016/0173160 A1 | 6/2016 | Gronewoller et al. | |
| 2017/0078781 A1 | 3/2017 | Qian et al. | |
| 2017/0093453 A1* | 3/2017 | Panecki | A45C 13/005 |
| 2017/0094398 A1* | 3/2017 | Cousins | H02J 7/027 |

FOREIGN PATENT DOCUMENTS

| | | |
|---|---|---|
| WO | 2002017838 A1 | 3/2002 |
| WO | 2008037747 A1 | 4/2008 |
| WO | 2011018086 A1 | 2/2011 |
| WO | 2014075195 A1 | 5/2014 |
| WO | 2016036309 A1 | 3/2016 |
| WO | 2017205558 A1 | 11/2017 |

OTHER PUBLICATIONS

Motorola, Motorola_HINT_2014_1, 2014, pp. 1-3.*
International Search Report for PCT/SE2018/05003 dated Aug. 23, 2018.
Written Opinion for PCT/SE2018/05003 dated Aug. 23, 2018.
Swedish Search Report for SE1750004-2 dated May 22, 2018.
Swedish Search Report for SE1750005-9 dated May 22, 2018.
The Extended European Search Report for corresponding European Patent Application No. 187360819 completed Oct. 14, 2020 and dated Oct. 26, 2020.
Partial Supplementary Extended European Search Report from Corresponding App. No. EP 18736083.9 dated Jul. 1, 2020.

* cited by examiner

WIRELESS EARBUDS, AND A STORAGE AND CHARGING CAPSULE THEREFOR

CROSS-REFERENCE TO RELATED APPLICATIONS

This application is the US National Stage under 35 USC § 371 of International Application No. PCT/SE2018/050003, filed 3 Jan. 2018 which claims priority to Swedish App. No. 1750002-6 filed 3 Jan. 2017, Swedish App. No. 1750004-2 filed 5 Jan. 2017, and Swedish App. No. 1750005-9 filed 5 Jan. 2017, all of which are incorporated herein by reference.

TECHNICAL FIELD

The present invention generally relates to the field of wireless audio equipment, and more particularly to wireless earbuds and to storage and charging of such earbuds.

BACKGROUND

Wireless earbuds, also known as wireless in-ear headphones or earphones, are expected to become increasingly popular. The advent and rapid growth of digital audio streaming services, such as Spotify, Pandora, Rhapsody, Google Play Music All Access, iTunes Radio, Music Unlimited, Rdio, Xbox Music and Beats Music, are likely drivers behind the expected growing popularity and desire for wireless earbuds.

Important characteristics of wireless earbuds are physical size, component and manufacturing cost, convenience, user-friendliness, duration between battery chargings, operational reliability and, of course, the perceived acoustic quality of the streamed audio and the general user experience.

Wireless earbuds use internal rechargeable batteries and therefore require reliable recharging from time to time. They also need to withstand external wear and tear as much as possible.

WO 2016/036309 discloses a wireless earbud, preferably for use in a pair of wireless earbuds to provide a stereo music experience to the user. The wireless earbud comprises an earbud housing having a longitudinal main axis and an essentially circular cross section, a loudspeaker element, a rechargeable battery, at least one main printed circuit board having disposed thereon circuitry for wireless radio communication, audio codec and earbud operation control, and a charging interface member. It also discloses a storage and charging capsule for a pair of such wireless earbuds. The storage and charging capsule comprises a base part, an elongate intermediate part, the intermediate part having a longitudinal major axis, and a cover part being retractable over the intermediate part. The intermediate part has a first end attached to the base part, a second end, and an earbud chamber formed between the first and second ends. The earbud chamber is adapted to receive the pair of wireless earbuds arranged one after another along the longitudinal major axis of the intermediate part. The capsule further has a power source for charging the pair of wireless earbuds when placed in the earbud chamber in the intermediate part.

SUMMARY

It is an object of the invention to offer improvements in the technical field of wireless earbuds.

A first aspect of the present invention is a wireless earbud for in-ear use, comprising an earbud housing, a loudspeaker, a rechargeable battery, a first microphone, and a second microphone. The first microphone is adapted to pick up sound internally from an ear canal of a user wearing the wireless earbud, whereas the second microphone is adapted to pick up sound externally from outside of the ear canal of the user wearing the wireless earbud.

A second aspect of the present invention is a wireless earbud, comprising an earbud housing, a loudspeaker contained inside the earbud housing, a rechargeable battery contained inside the earbud housing, and a circuit board assembly contained inside the earbud housing. The circuit board assembly comprises a main circuit board comprising circuitry for wireless radio communication, an antenna circuit board comprising an elongate radiator pattern, and a third circuit board comprising power supply circuitry.

The circuit board assembly is spatially folded in different layers, such that the antenna circuit board is arranged in a first layer, the main circuit board is arranged in a second layer, and the third circuit board is arranged in a third layer. The rechargeable battery is interleaved with the spatially folded circuit board assembly, such that the first and second layers are provided at one side of the rechargeable battery and the third layer is provided at another side of the rechargeable battery, opposite said one side.

A third aspect of the present invention is a kit of parts comprising first and second wireless earbuds and a storage and charging capsule for the first and second wireless earbuds, wherein each of the first and second wireless earbuds is a wireless earbud in accordance with the first aspect of the invention.

The storage and charging capsule in the kit of parts according to the third aspect of the invention may comprise: an elongate insert part having an earbud chamber adapted to receive the wireless earbuds; a cover part for slidably receiving the elongate insert part, the cover part being placeable in an open position in which the cover part is retracted from the elongate insert part to allow insertion/removal of the wireless earbuds into/from the earbud chamber of the elongate insert part, and the cover part being placeable in a closed position in which it encapsulates the elongate insert part; a power source; and a magnetic connector interface being provided in the earbud chamber of the elongate insert part, being connected to the power source and being adapted to engage with a respective at least one charge pad of each earbud so as to secure the earbud in the earbud chamber and allow charging thereof by the power source.

Alternatively or additionally, the storage and charging capsule in the kit of parts according to the third aspect of the invention may comprise: an elongate insert part having an earbud chamber adapted to receive the wireless earbuds; a cover part for slidably receiving the elongate insert part, the cover part being placeable in an open position in which the cover part is retracted from the elongate insert part to allow insertion/removal of the wireless earbuds into/from the earbud chamber of the elongate insert part, and the cover part being placeable in a closed position in which it encapsulates the elongate insert part; a power source comprising a rechargeable battery; and a status indicator adapted to provide an indication of an estimated remaining number of rechargings of the wireless earbuds that the rechargeable battery is capable of before being recharged itself.

A fourth aspect of the present invention is a storage and charging capsule for at least one wireless earbud. The storage and charging capsule comprises an elongate insert part having an earbud chamber adapted to receive the or each wireless earbud. The storage and charging capsule also comprises a cover part for slidably receiving the elongate insert part. The cover part is placeable in an open position in which the cover part is retracted from the elongate insert part to allow insertion/removal of the or each wireless earbud into/from the earbud chamber of the elongate insert part. The cover part is also placeable in a closed position in which it encapsulates the elongate insert part.

The storage and charging capsule further comprises a power source, and a magnetic connector interface which is provided in the earbud chamber of the elongate insert part, is connected to the power source and is adapted to engage with a respective at least one charge pad of the or each earbud so as to secure the earbud in the earbud chamber and allow charging thereof by the power source.

A fifth aspect of the present invention is a storage and charging capsule for at least one wireless earbud. The storage and charging capsule comprises an elongate insert part having an earbud chamber adapted to receive the or each wireless earbud. The storage and charging capsule also comprises a cover part for slidably receiving the elongate insert part. The cover part is placeable in an open position in which the cover part is retracted from the elongate insert part to allow insertion/removal of the or each wireless earbud into/from the earbud chamber of the elongate insert part. The cover part is also placeable in a closed position in which it encapsulates the elongate insert part.

The storage and charging capsule further comprises a power source, and a status indicator adapted to provide an indication of an estimated remaining number of rechargings of the or each wireless earbud that the rechargeable battery is capable of before being recharged itself.

The storage and charging capsule according to the fourth or fifth aspect may advantageously be configured for storing and charging at least one earbud according to the first or second aspect.

Embodiments of the invention are defined by the appended dependent claims and are further explained in the detailed description section as well as on the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Objects, features and advantages of embodiments of the invention will appear from the following detailed description, reference being made to the accompanying drawings.

DETAILED DESCRIPTION

Figure 1:
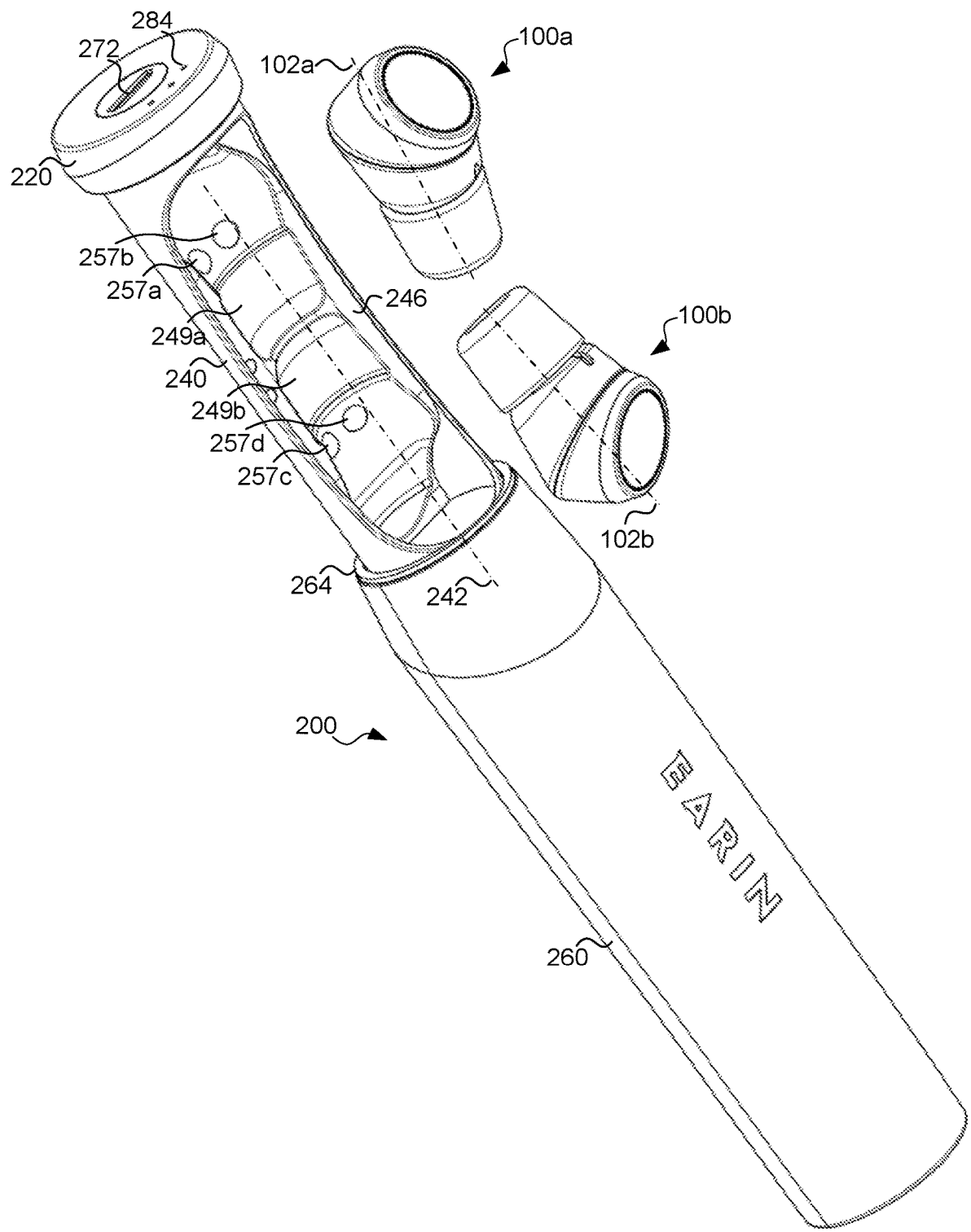
FIG. 1 is a schematic isometric view of a storage and charging capsule for a pair of wireless earbuds, the earbuds being shown positioned outside of the capsule.
Figure 2:
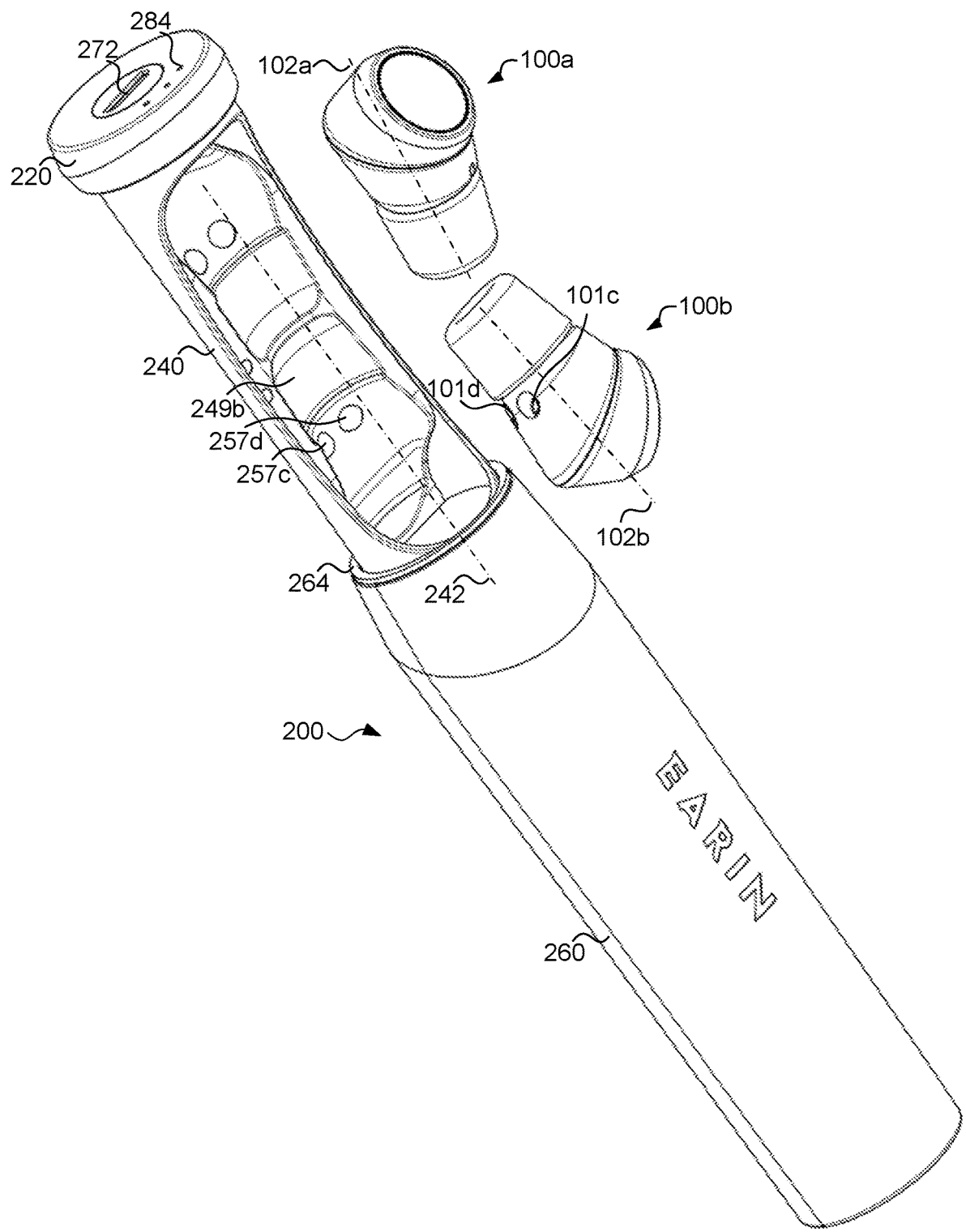
FIG. 2 is a schematic isometric view of the storage and charging capsule, similar to the view in FIG. 1 but with one of the earbuds being in a rotated position compared to FIG. 1, thereby showing a charging interface of this earbud.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

With reference mainly to FIGS. 1-5, a storage and charging capsule for at least one wireless earbud will now be described. Preferably, like in FIGS. 1-5, the storage and charging capsule 200 is adapted for use with first and second wireless earbuds 100a, 100b, i.e. a pair of wireless earbuds. An embodiment of a wireless earbud 100, which may be one of the wireless earbuds 100a, 100b and thus is suitable for use with the storage and charging capsule 200, is illustrated in more detail in FIG. 6 and onwards. However, alternative embodiments are also conceivable where the storage and charging capsule of the present invention is adapted for use with only a single wireless earbud, or with more than two wireless earbuds.

Generally, the storage and charging capsule 200 has two main parts: an elongate insert part 240 and a cover part 260 for slidably receiving the elongate insert part 240. The elongate insert part 240 has an earbud chamber 246 which is adapted to receive each wireless earbud 100a, 100b.

To this end, the cover part 260 can be placed in an open position in which the cover part is retracted from the elongate insert part to allow insertion or removal of each wireless earbud 100a, 100b into/from the earbud chamber 246 of the elongate insert part 240. The storage and charging capsule 200 is seen with the cover part 260 in its open position in FIGS. 1 and 2.

The cover part can furthermore be placed in a closed position in which it encapsulates the elongate insert part. The storage and charging capsule 200 is seen with the cover part 260 in its closed position in the sectional view of FIG. 4.

Generally, the storage and charging capsule 200 has a power source 270 which allows charging of each wireless earbud 100a, 100b when placed in the earbud chamber 246. To this end, a magnetic connector interface 257 is provided in the earbud chamber 246 of the elongate insert part 240. The magnetic connector interface 257 is connected to the power source 270 and is adapted to engage with a respective charge pad 101 of the earbud 100a or 100b. The magnetic connector interface 257 has dual purposes—to secure the earbud 100a or 100b in the earbud chamber 246 and to allow charging thereof by the power source 270.

The disclosed embodiment of the storage and charging capsule 200 will now be described in more detail with reference to FIGS. 1-5.

As already mentioned, the disclosed embodiment is adapted for use with first and second wireless earbuds 100a, 100b. The disclosed embodiment of the storage and charging capsule 200 further has a base part 220, as is seen in FIGS. 1-4. The elongate insert part 240 has a first end 244 and a second end 245, with the first end 244 being connected to the base part 220. The cover part 260 has a tubular housing 261 which is preferably made of metal such as stainless steel or aluminium. The cover part 260 has a first end 264 and a second end 265, wherein the first end 264 is adapted for slidably receiving the elongate insert part 240 and will abut against the base part 220 in the closed position of the cover part 260. In the closed position of the cover part 260, the storage and charging capsule 200 will take the approximate form of a cylinder, one end of which tapers slightly towards the base part 220, as seen in FIG. 4.

The earbud chamber 246 is formed in a first section 247 of the elongate insert part 240 between the first and second ends 244, 245. The earbud chamber 246 has an earbud support element 249 which is shaped and adapted to receive the first and second wireless earbuds arranged one after another along a longitudinal major axis 242 of the elongate insert part 240. To this end, the earbud support element 249 has first and second earbud compartments 249a and 249b, each being shaped to receive a respective one of the first and second wireless earbuds 100a, 100b.

In the disclosed embodiment according to FIGS. 1-5, the magnetic connector interface 257 comprises a first pair of magnetic connectors 257a-b being provided in the first earbud compartment 249a, being connected to the power source 270 and being adapted to engage with a pair of charge pads of the first wireless earbud 100a so as to secure the first wireless earbud 100a in the first earbud compartment 249a and allow charging of the first wireless earbud 100a by the power source 270.

Furthermore, in the disclosed embodiment according to FIGS. 1-5, the magnetic connector interface 257 also comprises a second pair of magnetic connectors 257c-d being provided in the second earbud compartment 249b, being connected to the power source 270 and being adapted to engage with a pair of charge pads 101c-d of the second wireless earbud 100b so as to secure the second wireless earbud 100b in the second earbud compartment 249b and allow charging of the second wireless earbud 100b by the power source 270.

More specifically, each earbud compartment 249a or 249b is shaped to receive its wireless earbud 100a or 100b at a specific orientation around its longitudinal main axis 102a or 102b, so that the magnetic connectors 257c-d are aligned with the charge pads 101c-d of the wireless earbud 100a or 100b. The magnetic connectors 257c-d will then secure the wireless earbud 100a or 100b in the earbud compartment 249a or 249b by magnetic attraction to the charge pads 101c-d of the wireless earbud 100a or 100b, and at the same time establish reliable electric contact with the power source 270 to ensure that the charging of the wireless earbud 100a or 100b may proceed undisturbed to the maximum extent possible, even if the storage and charging capsule 200 is carried around by the user in a potentially shaky environment. Hence, reliable reception, securing and charging of the wireless earbud 100a or 100b in the storage and charging capsule 200 is obtained in a component and space efficient manner.

Figure 3:
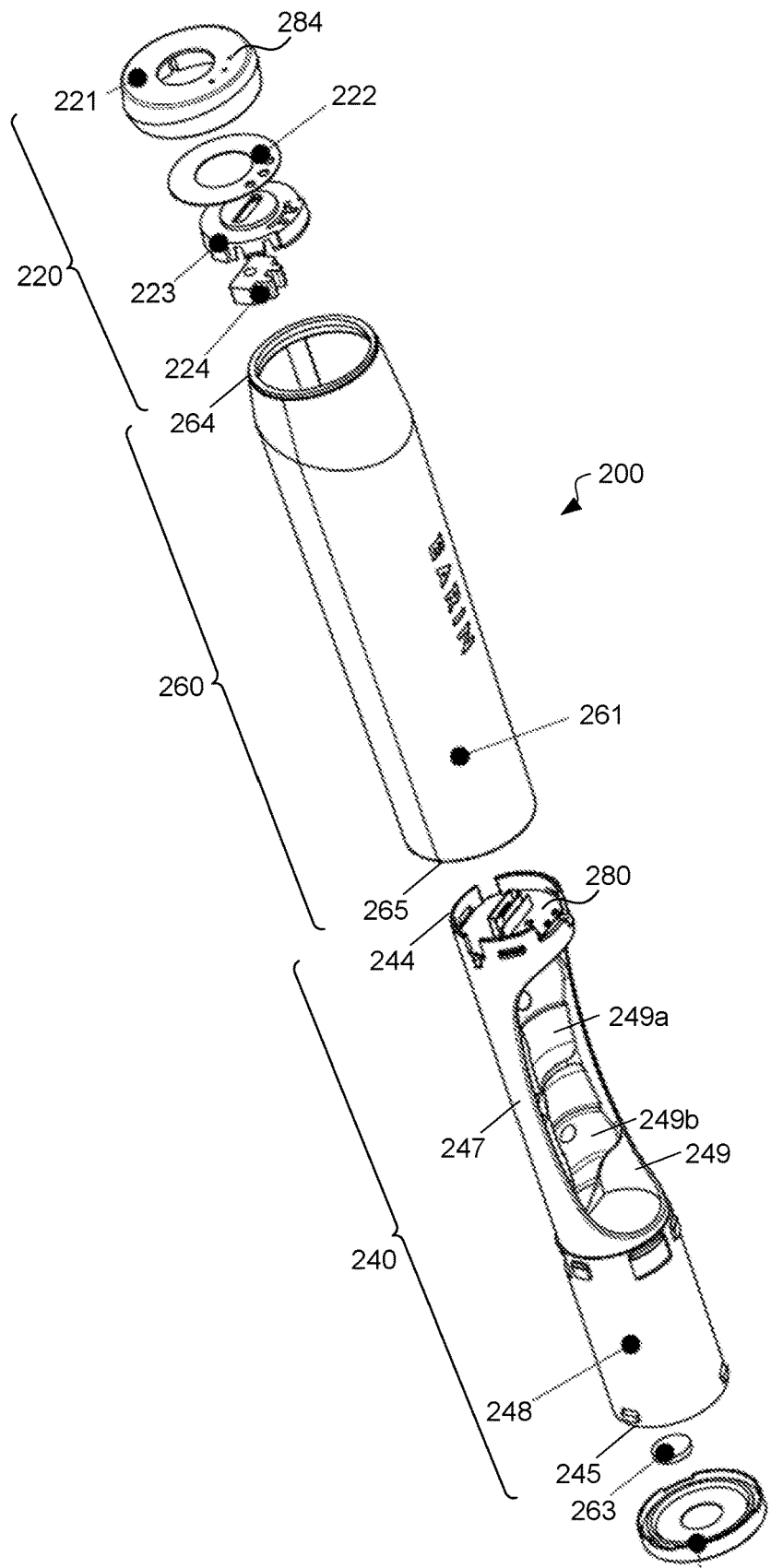
FIG. 3 is a schematic exploded view of the storage and charging capsule in FIGS. 1 and 2.
Figure 4:
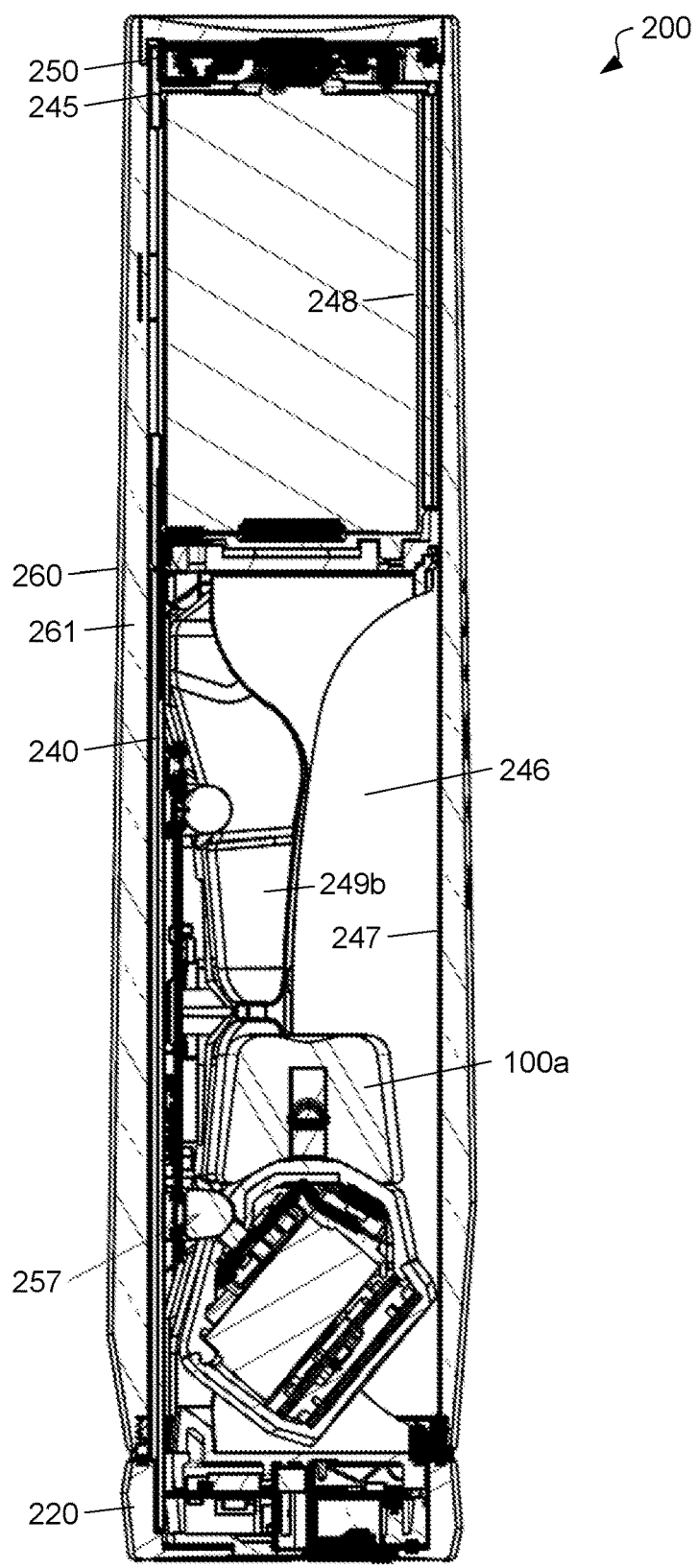
FIG. 4 is a sectional view of the storage and charging capsule in FIGS. 1-3.
Figure 5:
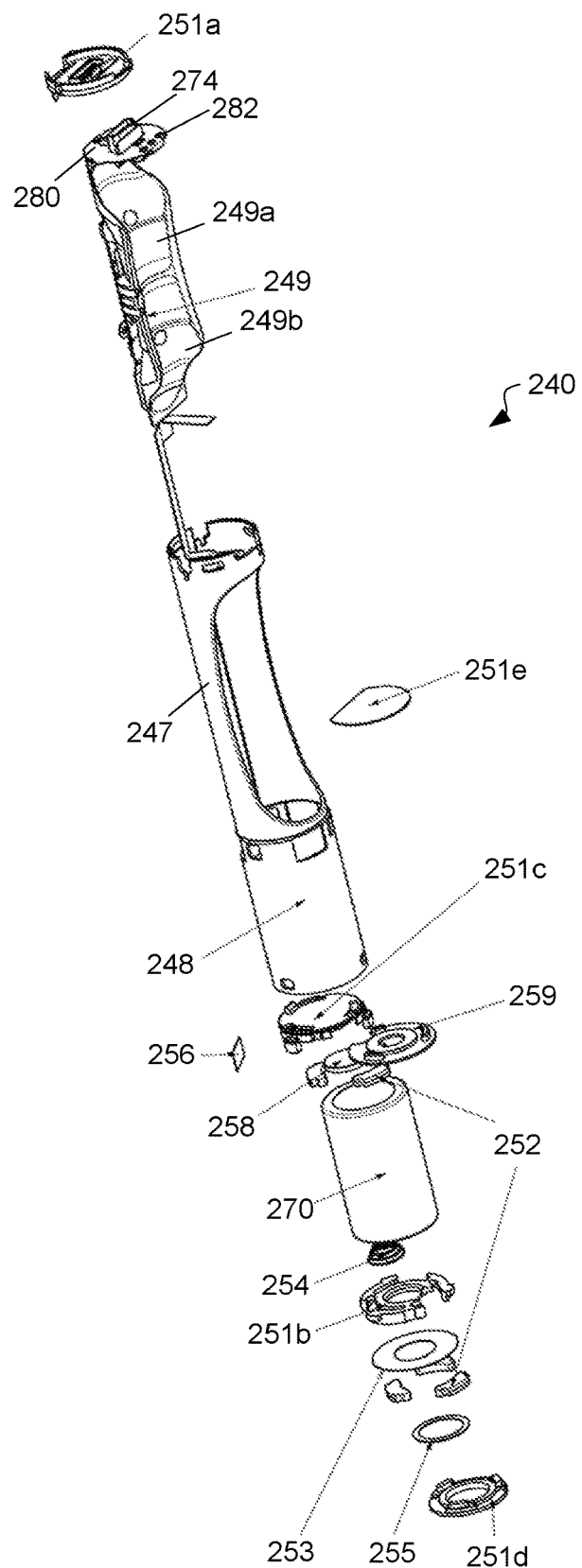
FIG. 5 is a schematic exploded view of an elongate insert part of the storage and charging capsule in FIGS. 1-4, the elongate insert part having an earbud chamber adapted to receive the wireless earbuds.

In the disclosed embodiment according to FIGS. 1-5, the power source 270 comprises a rechargeable battery. The rechargeable battery 270 is accommodated in a second section 248 of the elongate insert part 240 and may, for instance, be a 3.7 V lithium ion battery. As seen particularly in FIGS. 1, 2 and 5, the storage and charging capsule 200 further comprises a charging interface 272, 274 for the rechargeable battery 270. The charging interface 272, 274 is accessible for the user at the base part 220, as seen at 272, and moreover comprises an internal connector element 274 provided on a circuit board 280 connected to the earbud support element 249, as seen in FIG. 5. The charging interface 272, 274 may, for instance, be compliant with a USB (Universal Serial Bus) standard.

The rechargeable battery 270 preferably has a capacity which allows a plurality of rechargings of the wireless earbuds 100a, 100b before the rechargeable battery 270 needs to be recharged again. To facilitate for the user, the storage and charging capsule 200 of the disclosed embodiment therefore has a status indicator 282, 284 adapted to provide an indication of an estimated remaining number of rechargings of the first and second wireless earbuds 100a, 100b that the rechargeable battery 270 is capable of before being recharged itself.

The status indicator 282, 284 comprises one or more light emitting diodes 282 provided on the circuit board 280. The light from the one or more light emitting diodes 282 is made externally visible at 284 on a top cover element 221 of the base part 220, as seen particularly in FIG. 3. The indication may preferably be "hidden" in the sense that the status indicator 282, 284 is only visible to the user when lit but not when turned off.

The status indicator 282, 284 may indicate the estimated remaining number of rechargings of the first and second wireless earbuds 100a, 100b in any way appropriate, such as for instance by way of different colors (e.g. green representing many remaining rechargings, yellow representing less remaining rechargings, and red representing few or no remaining rechargings), or by turning on a number of light emitting diodes 282 corresponding to the estimated remaining number of rechargings.

In the disclosed embodiment, the status indicator 282, 284 is operated in the following way in order to indicate the estimated remaining number of rechargings of the first and second wireless earbuds 100a, 100b. The storage and charging capsule 200 has a sensor arrangement to detect when the cover part 260 is in its closed position encapsulating the elongate insert part 240. The storage and charging capsule 200 also has auto-indication functionality, responsive to said sensor arrangement and adapted to cause the status indicator 282, 284 to automatically provide the indication of the estimated remaining number of rechargings when the cover part 260 is retracted from its closed position.

As seen in FIG. 3, the sensor arrangement comprises a conductive cushion 263 provided at the second end 265 of the cover part 260, or more specifically at a bottom cover element 262 thereof. The sensor arrangement also comprises circuitry 250 provided at the second end 245 of the elongate insert part 240 and configured to detect a short circuit caused by electric contact with the conductive cushion 263 when the second end 265 of the cover part 260 is positioned at the second end 245 of the elongate insert part 240.

In addition to indicating the estimated remaining number of rechargings of the first and second wireless earbuds 100a, 100b, the status indicator 282, 284 may also be used for other indication purposes, as will be understood by the skilled reader.

In one advantageous embodiment of the storage and charging capsule 200, the capsule 200 further comprises auto-standby functionality, responsive to said sensor arrangement 263, 250 and adapted to cause the storage and charging capsule 200 to enter a standby mode when the cover part 260 is brought to its closed position. Hence, beneficial use is made of the same sensor arrangement both for providing status indication of the estimated remaining number of rechargings of the first and second wireless earbuds 100a, 100b, and for causing the storage and charging capsule 200 to enter into standby mode. This, therefore, is an implementation which is beneficial in terms of component cost, power consumption efficiency as well as user convenience.

As seen in FIG. 3 and in addition to the aforementioned top cover element 221, the base part 220 also comprises a top cover adhesive 222, a light guide 223 and a light emitting diode cover element 224.

As seen in FIG. 5 and in addition to the elements already mentioned, the elongate insert part 240 also comprises slide support elements 251 *a-c*, a slide support locking 251 *d*, a slide support label 251 *e*, a plurality of magnets 252, a magnet locking adhesive 253, a contact spring 254, a slide locking adhesive 255, Kapton tape 256, foam battery support 258, and a spacer 259. The elongate insert part 240 moreover comprises a power transmission arrangement for feeding electric power from the rechargeable battery 270 to the wireless earbuds 100 *a*, 100 *b* when placed in the earbud chamber 246 in the elongate insert part 240.

There are a total of six magnets 252 in the disclosed embodiment, and they serve to keep the cover part 260 securely in its open position as well as its closed position with respect to the elongate insert part 240. Hence, accidental retraction of the cover part 260 to its open position and resulting potential loss or damage of the earbuds 100a, 100b in the capsule 200 may be prevented, and so may accidental closing of the cover part 260 when the user is in the process of inserting the earbuds 100a, 100b into the capsule 200 or removing them therefrom.

An embodiment of a wireless earbud 100, which may be one of the wireless earbuds 100a, 100b as referred to above in conjunction with the storage and charging capsule 200, will now be described in more detail with reference to FIGS. 6-19.

FIGS. 6 to 11, 18A-C and 19A-B show the wireless earbud 100 in schematic isometric, exploded and sectional views, respectively. Even though shown in isolation, the earbud 100 will typically be used together with a second earbud to form a pair of earbuds, like the earbud pair 100a, 100b as previously referred to. One of the earbuds may then be used for playing right-channel stereo audio into one ear of the user, whereas the other earbud may be used for playing left-channel stereo audio into the other ear. Alternatively or additionally, and as will be understood from the following description, one or both of such earbuds may also be used for handsfree telephonic audio communication involving both incoming and outgoing audio by means of a loudspeaker and one or more microphones.

For the illustrated embodiment, the principal components of the wireless earbud 100 are as follows. Also see the enclosed independent claims.

The wireless earbud 100 comprises an earbud housing 110, a loudspeaker 130 and a rechargeable battery 140. The disclosed embodiment moreover comprises two microphones 132, 134 (seen in FIG. 16). The first microphone 132 is adapted to pick up sound internally from an ear canal of a user wearing the wireless earbud 100, whereas the second microphone 134 is adapted to pick up sound externally from outside of the ear canal of the user wearing the wireless earbud 100. Other embodiments may comprise just a single microphone, or even no microphone at all.

Figure 6:
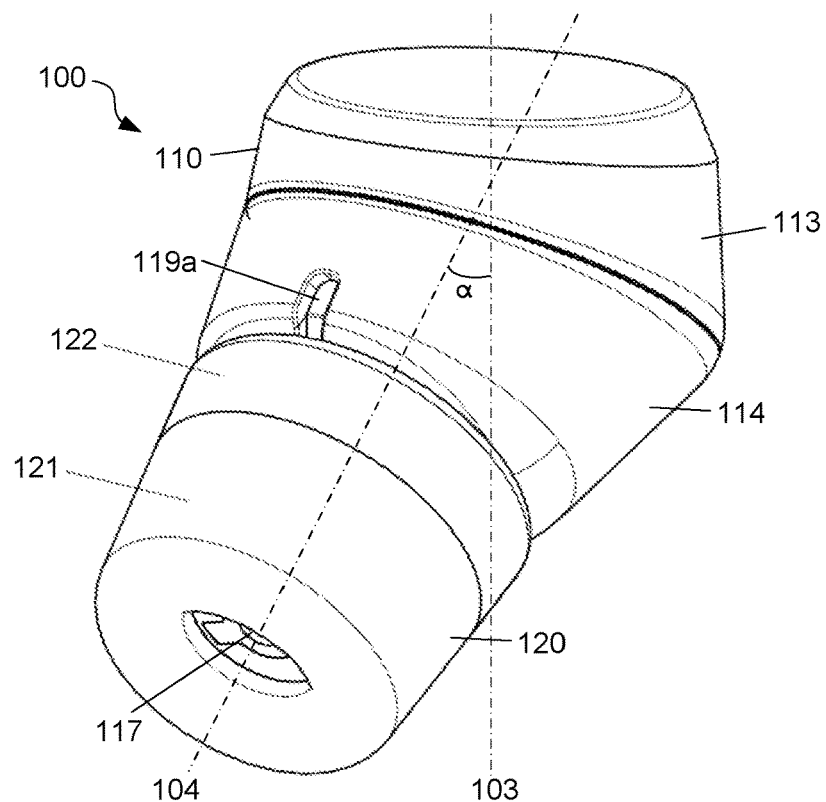
FIG. 6 is a schematic isometric view of a wireless earbud.
Figure 11:
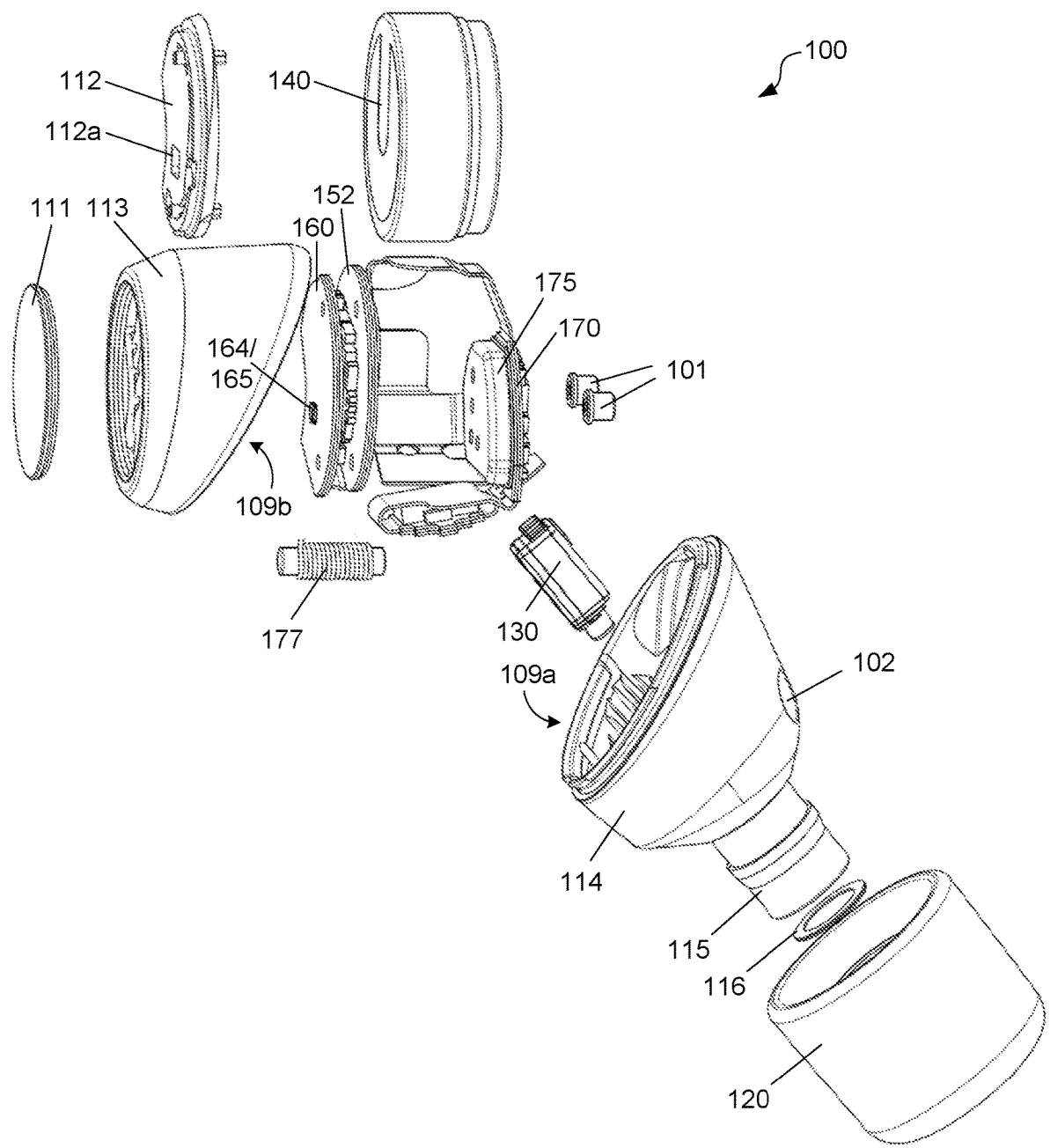
FIG. 11 is a schematic exploded view of the wireless earbud in FIGS. 6-10.

The earbud housing 110 comprises first and second housing parts 113, 114, as seen in FIG. 11. The first and second housing parts 113, 114 define an internal cavity 109a, 109b when assemblied together, as seen in FIG. 6. The internal cavity 109a, 109b contains the loudspeaker 130, rechargeable battery 140, a circuit board assembly 150, first microphone 132 and second microphone 134.

The earbud housing 110 also comprises an additional housing part 112 which supports a top cover 111. The top cover 111 is made of a material, such as glass or plastics, suitable for allowing user actuation by touch, as will be described in more detail later. To this end, a window 112a in the additional housing part 112 is aligned with circuitry 164/165 for touch detection and LED indication provided on an upper side 162 of an antenna circuit board 160 comprised in the circuit board assembly 150.

Figure 8:
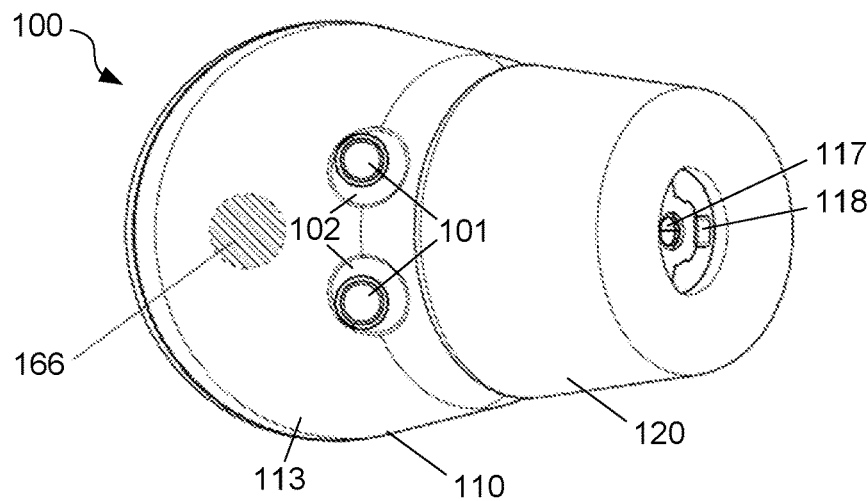
FIGS. 8-10 are different schematic isometric views of the wireless earbud in FIG. 6, showing the wireless earbud from different perspectives.
Figure 9:
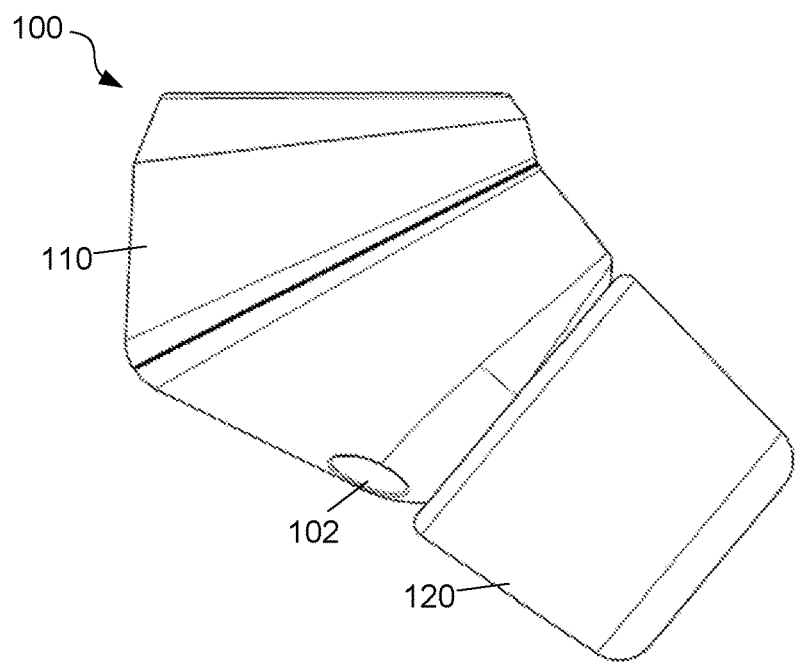
Figure 10:
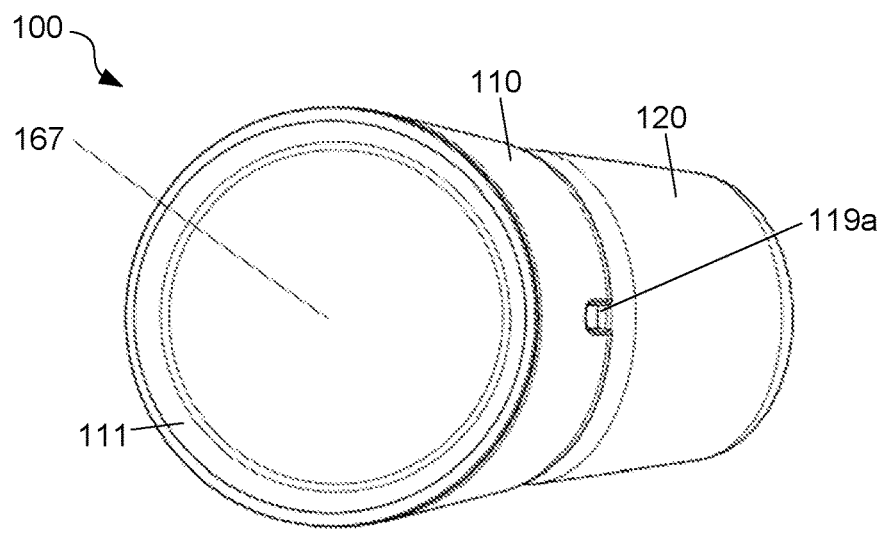

As seen particularly in FIG. 8, the first housing part 113 of the earbud housing 110 comprises first and second openings 102, through which first and second charge pads 101, respectively, are accessible for engagement with the magnetic connector interface 257 of the storage and charging capsule 200. Hence, the first and second charge pads 101 correspond, for instance, to the charge pads 101c and 101d referred to above for FIG. 2. The first and second charge pads 101 may be made of a magnetic metallic material, preferably steel, and more preferably gold-plated steel, and are seen in more detail in FIG. 11.

The earbud housing 110, or more specifically the second housing part 114, comprises a protruding part 115 which is adapted for supporting an earbud foam tip 120. Preferably, the frictional engagement between the protruding part 115 and the earbud foam tip 120 is designed to be firm but yet possible to interrupt. This will make sure that the foam tip 120 stays in place during normal use but may be removed for replacement by another foam tip for reasons of wear and tear or user preference.

Figure 7:
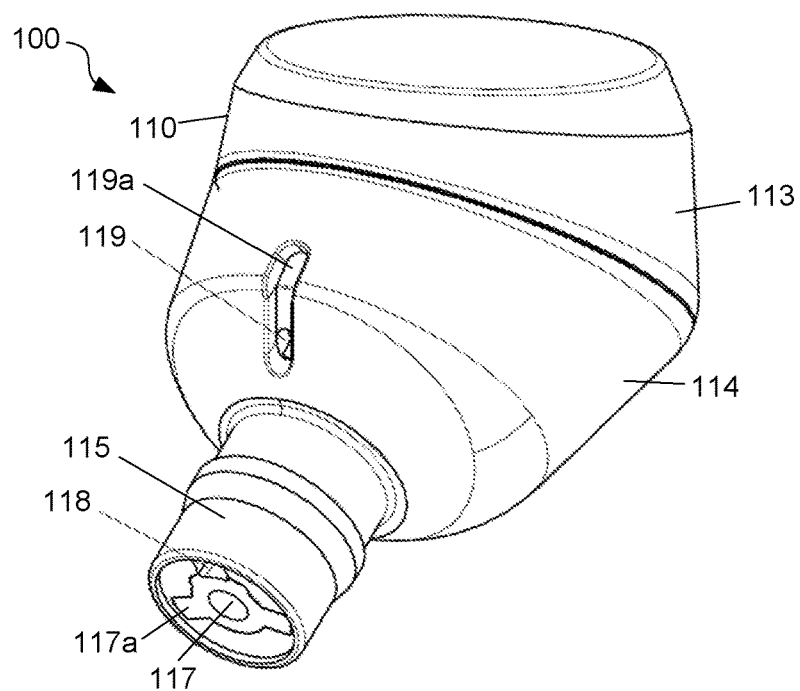
FIG. 7 is a schematic isometric view of the wireless earbud in FIG. 6 with a foam tip being removed.

As seen in FIG. 7, the protruding part 115 comprises an internal structure 117a which defines a loudspeaker sound guiding channel to provide acoustic coupling between the loudspeaker 130 and a loudspeaker outlet 117 in the protruding part 115. The loudspeaker outlet 117 is positioned to be within the ear canal of the user wearing the wireless earbud. Hence, the earbud 100 of the disclosed embodiment is adapted for in-ear use in the sense that a part of the earbud foam tip 120 is placed in the user's ear canal during use.

Figure 17:
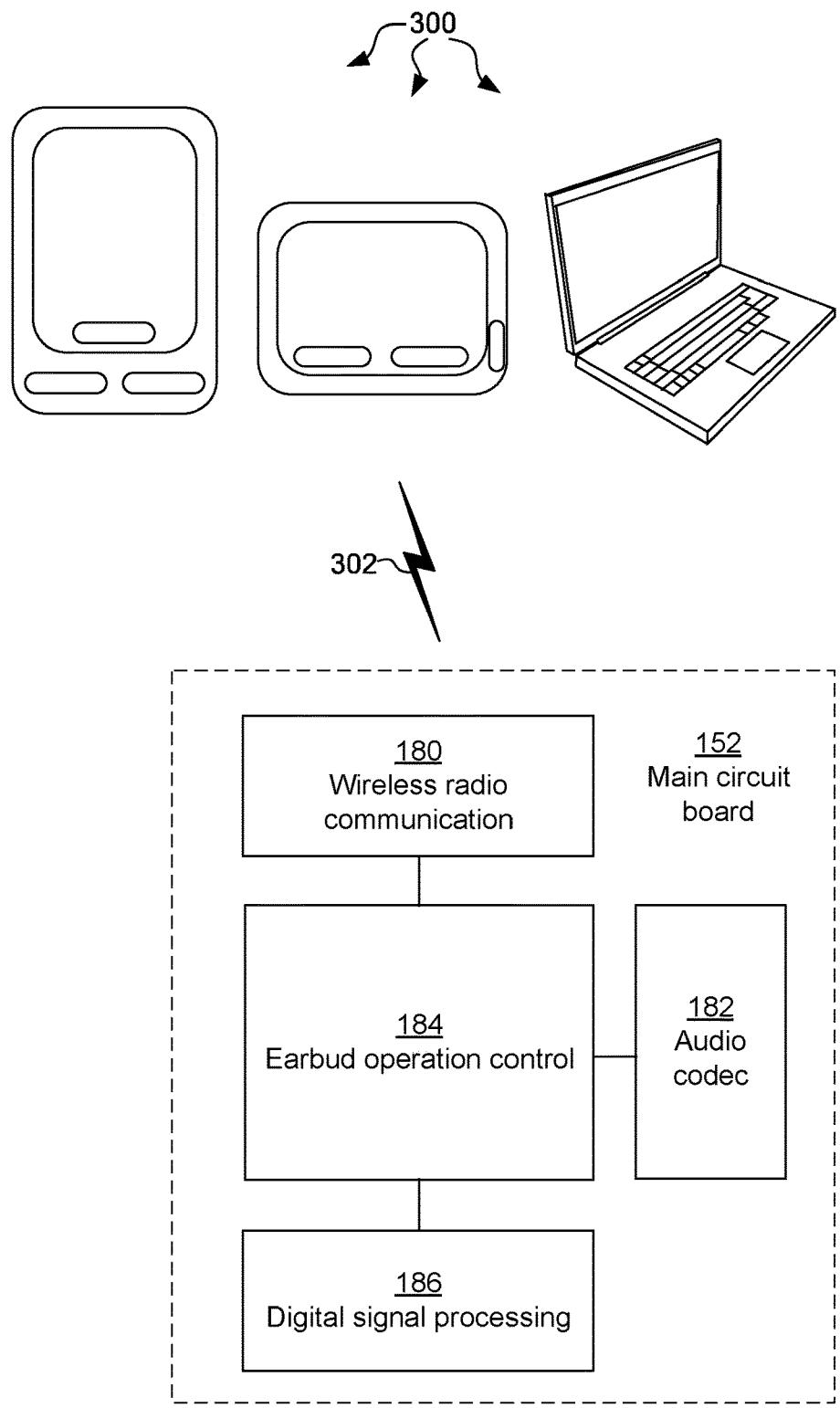
FIG. 17 is a schematic block diagram illustrating components of a main circuit board in the circuit board assembly.
Figure 18A:
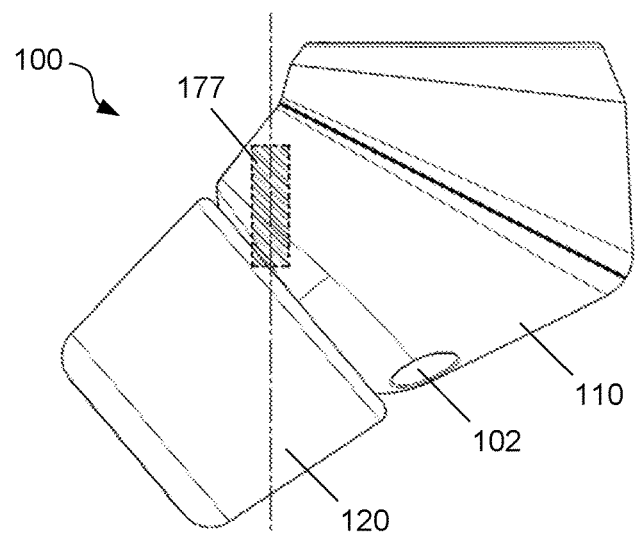
FIGS. 18A-C are schematic isometric views of the wireless earbud seen from different perspectives and illustrating the location of a near-field magnetic induction coil in the wireless earbud.
Figure 18B:
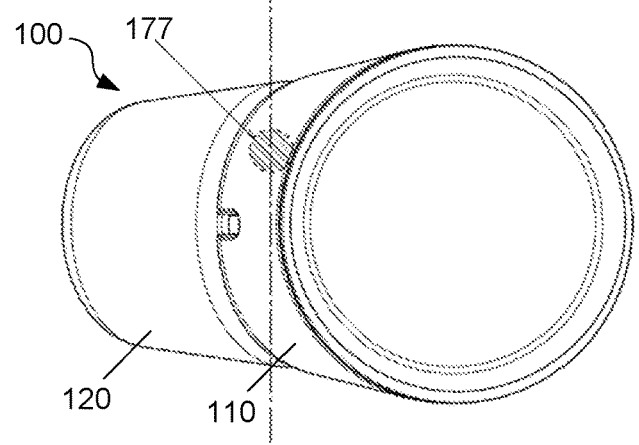
Figure 18C:
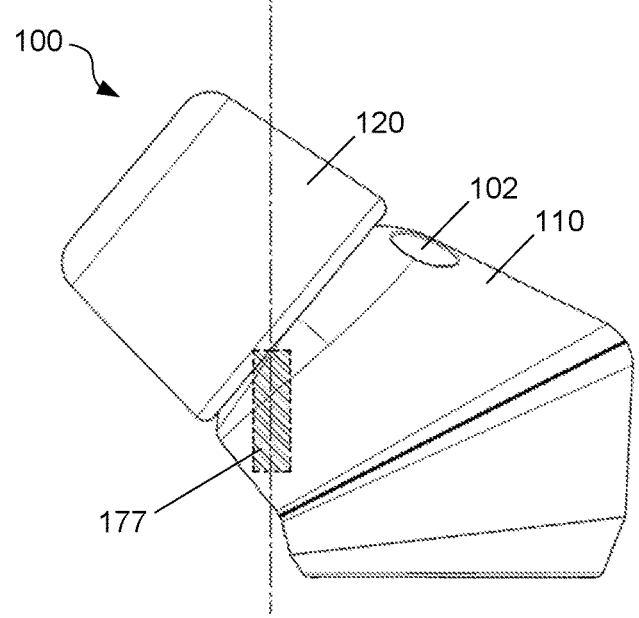
Figure 19A:
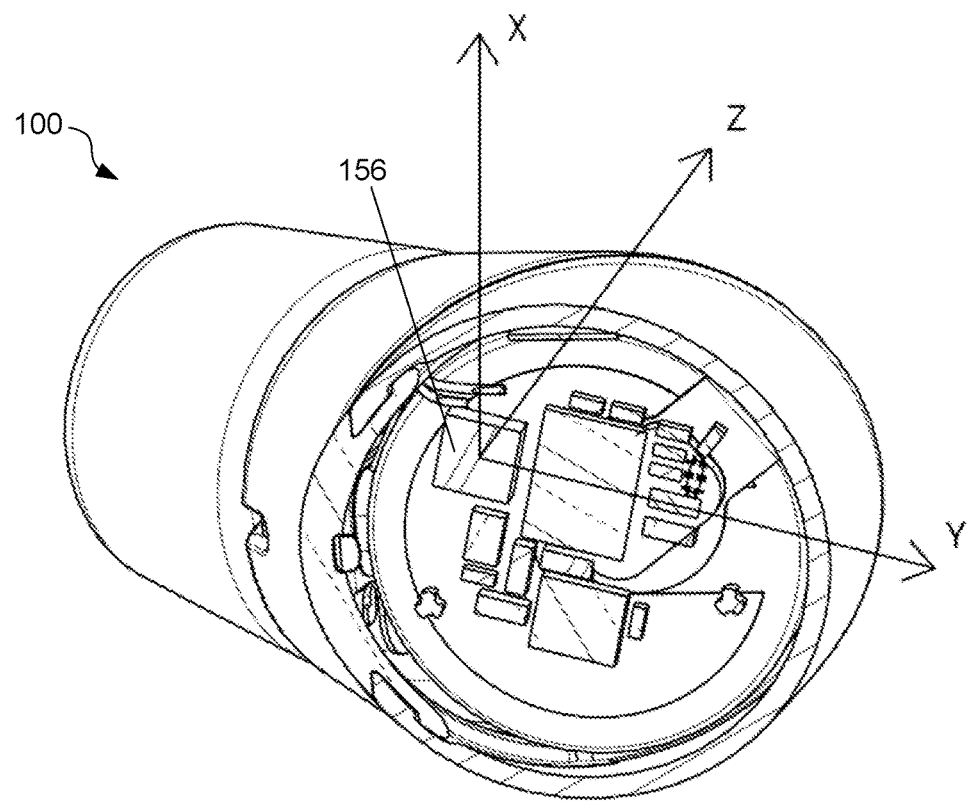
FIGS. 19A-B are schematic sectional views illustrating the use of an accelerometer or gyro to automatically determine whether a particular earbud is a right earbud or a left earbud.
Figure 19B:
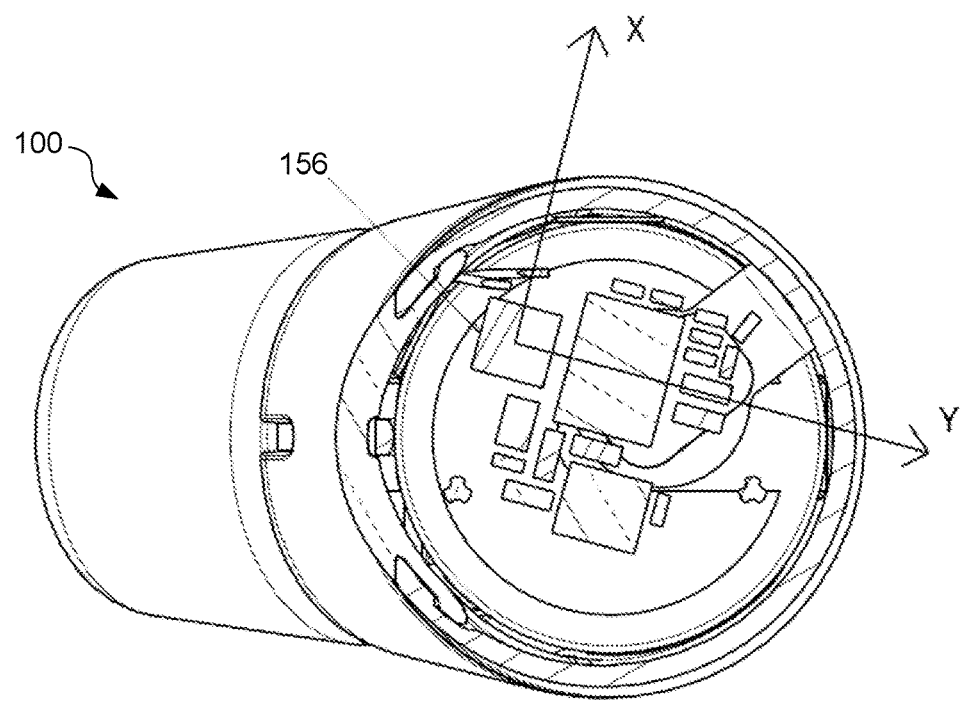

The loudspeaker 130 is operatively connected to audio codec circuitry 182 comprised in the circuit board assembly 150 (see FIG. 17). In the disclosed embodiment, the loudspeaker element 130 is a magnetic balanced armature (BA) receiver, such as for instance a RAB 32257 balanced armature speaker by Knowles Electronics, LLC., Itasca, Ill., USA. Using a balanced armature receiver for the loudspeaker 130 is advantageous, since it offers high audio performance at a small physical size. As a result, it has been made possible to design the earbud 100 to have a compact overall size.

The protruding part 115 of the earbud housing 110 furthermore defines a first microphone sound guiding channel to provide acoustic coupling between a first microphone inlet 118 in the protruding part 115 and the first microphone 132. The first microphone inlet 118 is positioned to be within the ear canal of the user wearing the wireless earbud. Moreover, the earbud housing 110 defines a second microphone sound guiding channel to provide acoustic coupling between a second microphone inlet 119 in the earbud housing 110 and the second microphone 134. Unlike the first microphone inlet 118, the second microphone inlet 119 is positioned to be outside of the ear canal of the user wearing the wireless earbud.

As seen in FIG. 6, the earbud foam tip 120 of the disclosed embodiment comprises a first portion 121 which is made of a sound insulating foam material, and a second portion 122 which is made of a sound permissive material, such as a wind blocking foam material. Hence, the first and second portions 121, 122 of the earbud foam tip 120 are made of materials having different acoustic characteristics. The first portion 121 of the earbud foam tip 120 is adapted to provide at least a semi-airtight seal between the first microphone inlet 118 and the second microphone inlet 119 when the user is wearing the wireless earbud. The second portion 122 of the earbud foam tip 120 covers the second microphone inlet 119, as seen in FIGS. 6 and 7. A groove 119a in the second housing part 114 admits a sufficient amount of ambient sound into the second microphone inlet 119, and some amount of ambient sound is also received through the second portion 122 of the earbud foam tip 120.

The provision and arrangement of the first and second microphones 132, 134 allow efficient noise reduction, as will now be explained in more detail. The circuit board assembly 150 further comprises circuitry for digital signal processing 186 (FIG. 17) configured to receive audio signals from the first and second microphones 132, 134 and perform noise reduction upon them so as to separate a voice signal of the user from ambient noise.

In the disclosed embodiment, the circuitry for digital signal processing 186 is configured to perform the noise reduction by applying a blind source separation, BSS, algorithm, such as an independent component analysis, ICA, algorithm. The BSS/ICA algorithm is a "blind" algorithm which separates different signals from each other without knowing the signals or how they are mixed. The algorithm assumes a number of unknown source signals and a number of receivers. Between each source signal and each receiver there is a transfer function. The source signals as well as the transfer functions are unknown to the algorithm. However, the transfer functions should be as uncorrelated as possible for the algorithm to work efficiently.

In the case of the wireless earbud 100, a first source signal is the voice of the user wearing the wireless earbud 100 in his ear. The first source signal is the one which the algorithm seeks to filter out from ambient noise emanating from an arbitrary number of additional source signals 2-$n$. It is recalled that the first microphone 132 is adapted to pick up sound internally from the user's ear canal, in isolation from the external world by the provision of the first portion 121 of the earbud foam tip 120. The second microphone 134 is instead adapted to pick up sound externally from outside of the user's ear canal.

This means that a first transfer function between the first source signal (the user's voice) and the first microphone 132 will represent audio transfer being made solely through the user's flesh and bone through his head up to the ear canal.

A second transfer function between the first source signal (the user's voice) and the second microphone 134 will represent audio transfer through air between the user's mouth and the location of the second microphone 134 outside of the user's ear canal.

Additional transfer functions between the additional source signals 2-$n$ (sources of ambient noise) and the first microphone 132 will represent audio transfer through air and then through the user's flesh and bone through his head to the ear canal.

Additional transfer functions between the additional source signals 2-$n$ (sources of ambient noise)) and the second microphone 134 will represent audio transfer through air.

The BSS/ICA algorithm makes use of differences in phase/frequency response of the different transfer functions to separate the user's voice from ambient noise in the audio signals recorded by the first and second microphones 132, 134.

Reference is now made to the circuit board assembly 150, which inter alia comprises circuitry for wireless radio communication 180, audio codec 182 and earbud operation control 184 (FIG. 17).

As seen particularly in FIGS. 11-16, the circuit board assembly 150 comprises a plurality of circuit boards, including a main circuit board 152, an antenna circuit board 160 and a safety/charging circuit board 170. The circuit board assembly 150 moreover comprises a microphone circuit board 136 for the first and second microphones 132, 134, and an NMFI coil circuit board 178 for a near-field magnetic coil 177. The near-field magnetic coil 177 may for instance be used as a T coil in hearing aid applications. However, other embodiments are also possible where no microphones or no near-field magnetic coil are provided, and hence no microphone circuit board or NMFI coil circuit board either.

Figure 12:
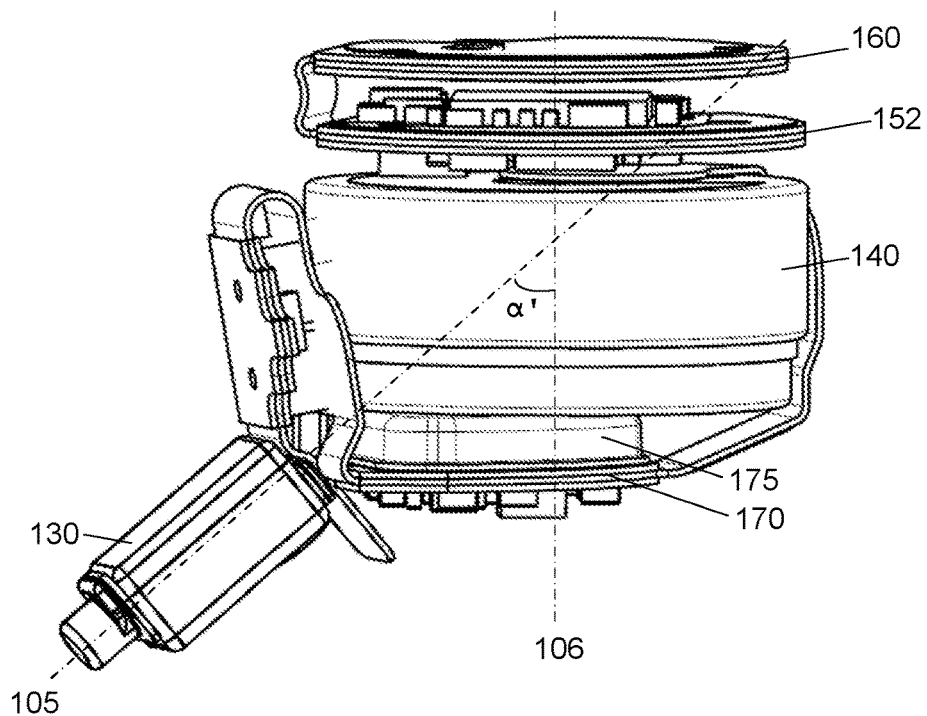
FIG. 12 is a schematic isometric view of a main component assembly in the wireless earbud in FIGS. 6-11.
Figure 13:
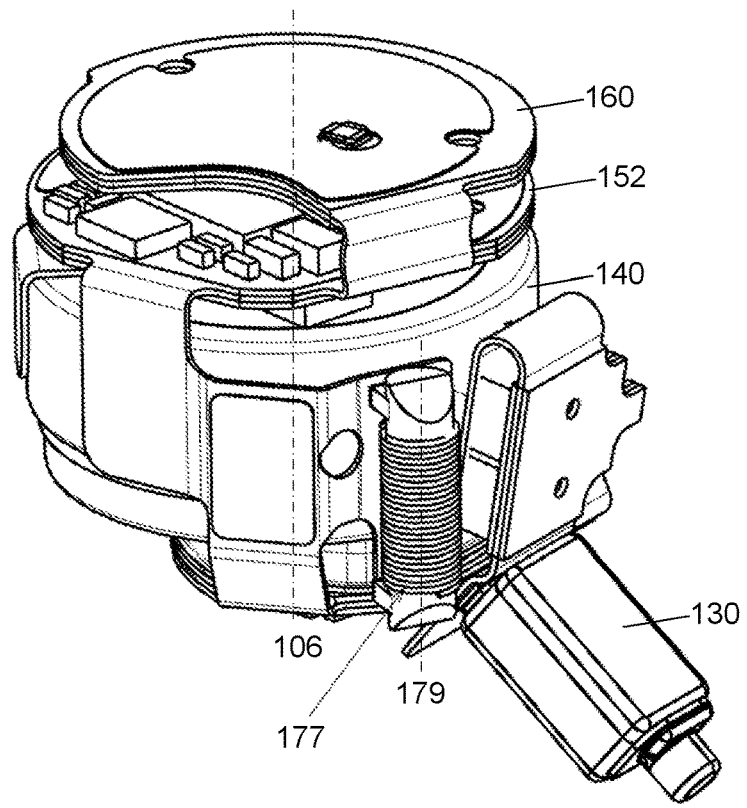
FIG. 13 is another schematic isometric view of the main component assembly.

The circuit board assembly 150 may advantageously be implemented in flex-rigid (or rigid-flex) electronic circuitry manufacturing technology, wherein the circuit boards 152, 160, 170, 136 and 178 are seen as different parts of one common physical structure, connected by means of flexible FPC connectors. In the disclosed embodiment, the circuit board assembly 150 is spatially folded in different layers, as seen in FIGS. 11-13. The antenna circuit board 160 is arranged in a first layer, the main circuit board 152 is arranged in a second layer, and the third circuit board 170 is arranged in a third layer. The circuit board assembly 150 is shown in an unfolded condition in FIGS. 14-16 (i.e. prior to assembly of the wireless earbud 100).

The rechargeable battery 140 is interleaved with the spatially folded circuit board assembly 150, such that the first and second layers are provided at one side of the rechargeable battery 140 and the third layer is provided at another side of the rechargeable battery 140, opposite said one side. Hence, the battery 140 is sandwiched between the main circuit board 152 and the safety/charging circuit board 170.

This arrangement is particularly beneficial since it represents a space-efficient implementation which allows a multitude of earbud components 130, 140, 132, 134, etc, to fit together with the components of the circuit board assembly 150 itself inside the compact internal cavity 109a, 109b in the earbud housing 110.

In the disclosed embodiment, the layers of the spatially folded circuit board assembly 150 are parallel to each other and orthogonal to a center axis 106 of the circuit board assembly 150. The loudspeaker 130 is connected to the circuit board assembly 150 and arranged in a longitudinal main direction 105 at an angle α' to the center axis 106 of the circuit board assembly 150. The angle α' may, for instance, be about 40-60°, preferably about 50°. Correspondingly, an angle α between center axes 103, 104 of the first and second housing parts 113 and 114 of the earbud housing 110 (see FIG. 6) may, for instance, be about 40-60°, preferably about 50°. Preferably, α=α'.

The main circuit board 152 of the circuit board assembly 150 comprises circuitry for wireless radio communication 180, audio codec 182, earbud operation control 184 and digital signal processing 186. The circuitry may, for instance, be implemented by a BlueCore CSR8670 WLCSP System on a Chip (SoC) integrated circuit device for Bluetooth 4.0, mounted on a first side 154 of the main circuit board 152. In other embodiments, these functions may be implemented by different components, including but not limited to central processing units (CPUs), digital signal processor (DSPs), application-specific integrated circuits (ASICs) or field-programmable gate arrays (FPGAs). In other embodiments, in addition or as an alternative to Bluetooth 4.0, the wireless earbud 100 may be compliant with other Bluetooth versions, or with AirPlay, PlayFi, Miracast, WiDi, DLNA or Wi-Fi Direct, for instance, or any combinations thereof. Other circuitry may also be included on the main circuit board 152 in different embodiments.

Earbud operation control 184 may include general control of the wireless radio communication 180 e.g. for establishing, maintaining and communicating over a wireless link 302 to a wireless host device 300. The wireless host device 300 may for instance be a mobile terminal (e.g. smartphone), personal digital assistant, palmtop computer, tablet computer (a.k.a. surfpad), laptop computer, stationary computer, smart TV or video game console, without limitation. The wireless host device 300 may, for instance, be capable of connecting to a mobile telecommunication network in compliance with a mobile telecommunication standard, such as (without limitation) GSM, UMTS, LTE, LTE Advanced, D-AMPS, CDMA2000, FOMA or TD-SCDMA, and/or to a data communication network, such as the Internet. The user of the wireless earbud 100 may for instance use audio streaming services and/or handsfree telephonic services provided or distributed by the wireless host device 300.

Figure 16:
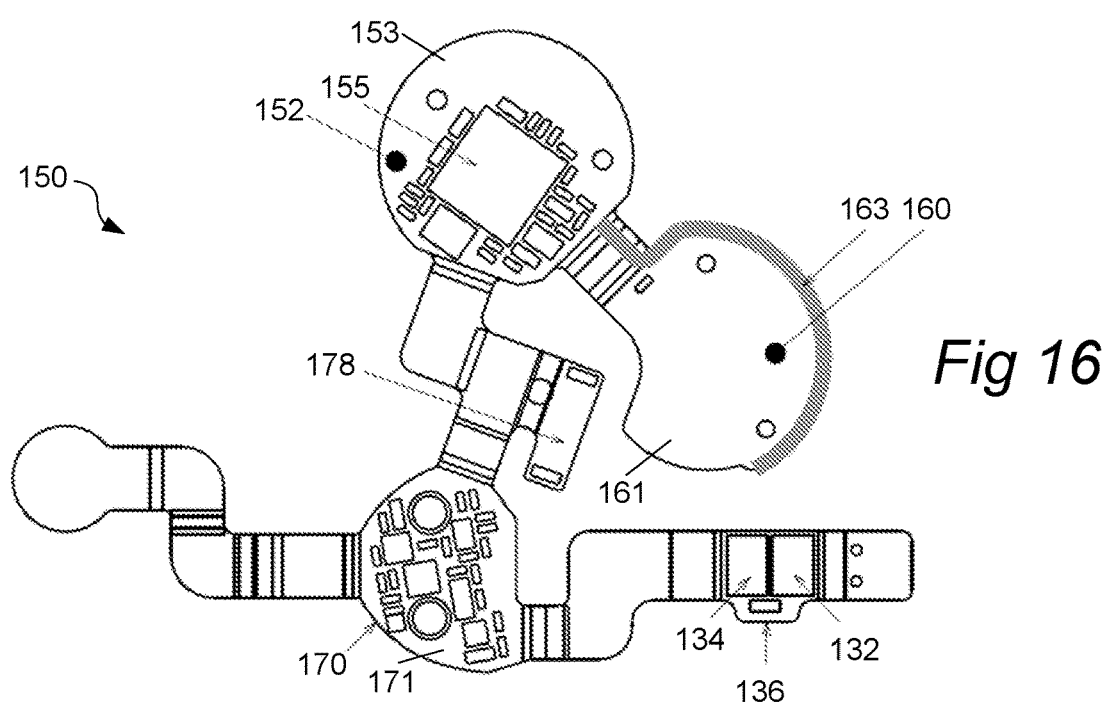
FIG. 16 is a schematic top view of the circuit board assembly in FIGS. 14 and 15.

The antenna circuit board 160 of the circuit board assembly 150 comprises an elongate radiator pattern 163 disposed at a portion of the circumference of the antenna circuit board 160. More specifically, in the disclosed embodiment, the elongate radiator pattern 163 is an edge-plated antenna, as is seen in FIG. 16. The elongate radiator pattern 163 is formed by means of gold plating in the disclosed embodiment; other conductive materials are of course possible as an alternative. The elongate radiator pattern 163 is an inverted F antenna being tuned for resonance at a quarter-wave length suitable for the circuitry for wireless radio communication 180.

The safety/charging circuit board 170 of the circuit board assembly 150 provides power management for receiving power from the rechargeable battery 140 and for charging the rechargeable battery 140 by means of, for instance, the storage and charging capsule 200. To this end, the safety/charging circuit board 170 comprises power supply circuitry 173, preferably switched-mode power supply circuitry (SMPS), mounted on a first side 172 of the safety/charging circuit board 170. The SMPS circuitry serves to supply power to the circuitry in the other parts of the circuit board assembly 150 and for controlling the charging of the battery 140. Moreover, the safety/charging circuit board 170 may contain charging interface/battery safety circuitry which serves to protect the battery 140 in the earbud 100 from overheating during charging by the capsule 200.

As is seen in FIGS. 11-13, the main circuit board 152 is provided between the antenna circuit board 160 and a top side of the rechargeable battery 140. The safety/charging circuit board 170 is provided between the loudspeaker 130 and a bottom side of the battery 140, i.e. on the opposite side of the battery 140 compared to the main circuit board 152 and the antenna circuit board 160.

This arrangement is advantageous at least in that it will reduce the risk of interference between, on the one hand, the SMPS circuitry 173 and/or the charging interface/battery safety circuitry on the safety/charging circuit board 170 and, on the other hand, the circuitry on the main circuit board 152 and the antenna circuit board 160. By separating the SMPS circuitry 173 and/or the charging interface/battery safety circuitry from the circuitry for wireless radio communication and its antenna, the risk of interference is reduced.

An electromagnetic shielding element 175 is provided between the third circuit board 170 and the main and antenna circuit boards 152, 160 to further reduce the risk for interference. More specifically, in the disclosed embodiment, the electromagnetic shielding element 175 is provided as a cap or cover of the safety/charging circuit board 170. The electromagnetic shielding element 175 may be made from suitable conductive and/or magnetic material.

The near-field magnetic coil 177, which is connected to the NMFI coil circuit board 178 of the circuit board assembly 150, is arranged on the outside of the circuit board assembly 150 in a longitudinal main direction 179 which is parallel to the center axis 106 of the circuit board assembly 150. Hence, the near-field magnetic coil 177 extends in a direction which is orthogonal to the layers of the circuit board assembly 150, including the antenna circuit board 160 and its radiator pattern 163. This arrangement is advantageous, not only because it represents a space-efficient implementation but, even more importantly, because it minimizes the interference between the magnetic flux of the near-field magnetic coil 177 and the circuitry of the circuit board assembly 150. Hence, the near-field magnetic coil 177 may be used, for instance, as a T coil in hearing aid applications.

The main circuit board 152 of the circuit board assembly 150 also comprises accelerometer and/or gyro circuitry 156 mounted on a second side 154 of the main circuit board 152. The accelerometer/gyro circuitry 156 may be used for detecting whether the particular earbud 100 in a pair of earbuds 100a, 100b is a right earbud or a left earbud, by determining a direction of the earbud in a three-dimensional coordinate system. This is illustrated in more detail in FIGS.

19A and 19B. It is recalled that listeners to stereo audio may prefer to listen to right-channel stereo audio in the earbud 100a which is worn in the user's right ear, and conversely to left-channel stereo audio in the other earbud 100b which is worn in the user's left ear—but not the opposite way.

The accelerometer/gyro circuitry 156 is hence configured to provide a signal indicative of an orientation of the wireless earbud 100 in three dimensions. The wireless earbud 100 further has functionality for determining, based on the signal from the accelerometer/gyro circuitry 156, whether the wireless earbud 100 is worn by the user as a right earbud or a left earbud. This functionality may, for instance, be provided by suitable programming of the digital signal processing circuitry 186.

The wireless earbud 100 moreover has functionality to feed the loudspeaker 130 with right-channel stereo audio if it has been determined that the wireless earbud 100 is worn by the user as a right earbud, and with left-channel stereo audio if it has been determined that the wireless earbud 100 is worn by the user as a left earbud. This functionality may, for instance, be provided by the audio codec 182.

The use of the accelerometer/gyro circuitry 156 to automatically determine whether the particular earbud 100 is a right earbud or a left earbud gives an advantage in that the earbuds may be produced, distributed and sold as fully symmetrical (identical) units. Moreover, it eliminates the need to mark each earbud with an R or an L, and accordingly eliminates the need for the user to look for such marks when inserting the earbuds 100a, 100b in the right and left ears.

Figure 14:
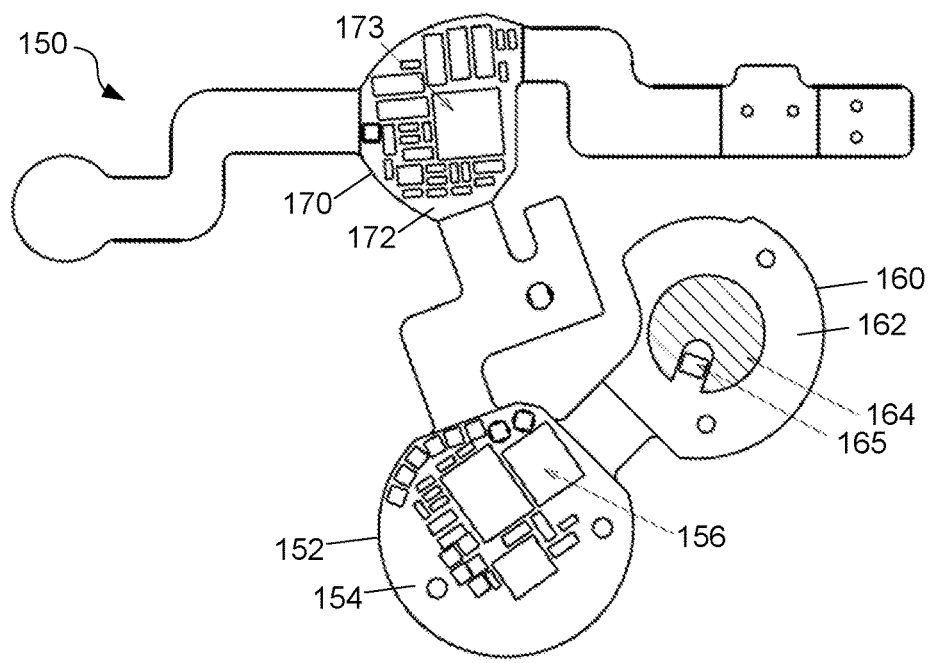
FIG. 14 is a schematic rear view of a circuit board assembly being part of the main component assembly in FIGS. 12 and 13, the circuit board assembly being shown in an unfolded condition.
Figure 15:
FIG. 15 is a schematic side view of the circuit board assembly in FIG. 14.

On a second side 162 of the antenna circuit board 160 of the circuit board assembly 150, touch sensitive circuitry 164 is provided. This is seen in FIG. 14. The touch sensitive circuitry 164 serves to detect user actuation by way of tapping on the top cover 111 of the earbud housing 110. In this way, the user may control various functionality of the wireless earbud 100, such as for instance playing and pausing music, answering, declining and ending telephone calls, adjusting a volume of sound provided by the loudspeaker 130, etc. The touch sensitive circuitry 164 thus forms part of a user interface of the wireless earbud 100.

The user interface of the wireless earbud 100 also includes light emitting diode (LED) indication, see element 165 on the second side 162 of the antenna circuit board 160 in FIG. 14. The LED indication is made visible at the top cover 111 and may be used to provide feedback to the user resulting from his actuation. The LED indication may also be used to provide status indication to the user.

The user interface functionality thus provided by the touch sensitive circuitry 164 may be configurable by the user by using an application program in the wireless host device 300.

The disclosed embodiment of the wireless earbud 100 also has a touch-sensitive wake-up interface, as seen at 166 in FIG. 8.

The invention has been described above in detail with reference to embodiments thereof. However, as is readily understood by those skilled in the art, other embodiments are equally possible within the scope of the present invention, as defined by the appended claims.

The invention claimed is:
1. A wireless earbud for in-ear use, comprising:
an earbud housing;
a loudspeaker;
a rechargeable battery;
at least one charge pad of a magnetic metallic material, the at least one charge pad being adapted for engagement with a magnetic connector interface of a storage and charging capsule;
a first microphone adapted to pick up sound internally from an ear canal of a user wearing the wireless earbud;
a second microphone adapted to pick up sound externally from outside of the ear canal of the user wearing the wireless earbud; and
a circuit board assembly comprising circuitry for wireless radio communication, audio codec and earbud operation control,
wherein the earbud housing defines an internal cavity for containing the loudspeaker, rechargeable battery, circuit board assembly, first microphone and second microphone, and the earbud housing comprises a protruding part adapted for supporting an earbud foam tip,
wherein the protruding part of the earbud housing defines a loudspeaker sound guiding channel to provide acoustic coupling between the loudspeaker and a loudspeaker outlet in the protruding part, the loudspeaker outlet being positioned to be within the ear canal of the user when wearing the wireless earbud,
wherein the protruding part of the earbud housing furthermore defines a first microphone sound guiding channel to provide acoustic coupling between a first microphone inlet in the protruding part and the first microphone, the first microphone inlet being positioned to be within the ear canal of the user when wearing the wireless earbud,
wherein the earbud housing defines a second microphone sound guiding channel to provide acoustic coupling between a second microphone inlet in the earbud housing and the second microphone, the second microphone inlet being positioned to be outside of the ear canal of the user wearing the wireless earbud; and
wherein the earbud foam tip comprises:
a first portion made of a sound insulating foam material; and
a second portion made of a sound permissive material;
wherein the first portion of the earbud foam tip is adapted to provide at least a semi-airtight seal between the first microphone inlet and the second microphone inlet when the user is wearing the wireless earbud, and
wherein the second portion of the earbud foam tip covers the second microphone inlet.

2. A wireless earbud for in-ear use, comprising:
an earbud housing;
a loudspeaker;
a rechargeable battery;
at least one charge pad of a magnetic metallic material, the at least one charge pad being adapted for engagement with a magnetic connector interface of a storage and charging capsule;
a first microphone adapted to pick up sound internally from an ear canal of a user wearing the wireless earbud;
a second microphone adapted to pick up sound externally from outside of the ear canal of the user wearing the wireless earbud; and
a circuit board assembly comprising circuitry for wireless radio communication, audio codec and earbud operation control,
wherein the earbud housing defines an internal cavity for containing the loudspeaker, rechargeable battery, circuit board assembly, first microphone and second microphone, and the earbud housing comprises a protruding part adapted for supporting an earbud foam tip, wherein the protruding part of the earbud housing defines a loudspeaker sound guiding channel to provide acoustic coupling between the loudspeaker and a loudspeaker outlet in the protruding part, the loudspeaker outlet being positioned to be within the ear canal of the user when wearing the wireless earbud, wherein the protruding part of the earbud housing furthermore defines a first microphone sound guiding channel to provide acoustic coupling between a first microphone inlet in the protruding part and the first microphone, the first microphone inlet being positioned to be within the ear canal of the user when wearing the wireless earbud, wherein the earbud housing defines a second microphone sound guiding channel to provide acoustic coupling between a second microphone inlet in the earbud housing and the second microphone, the second microphone inlet being positioned to be outside of the ear canal of the user wearing the wireless earbud; and, wherein the circuit board assembly comprises:
 a main circuit board comprising the circuitry for wireless radio communication;
 an antenna circuit board comprising an elongate radiator pattern; and
 a third circuit board comprising power supply circuitry,
wherein the circuit board assembly is spatially folded in different layers, such that the antenna circuit board is arranged in a first layer, the main circuit board is arranged in a second layer, and the third circuit board is arranged in a third layer, and
wherein the rechargeable battery is interleaved with the spatially folded circuit board assembly, such that the first and second layers are provided at one side of the rechargeable battery and the third layer is provided at another side of the rechargeable battery, opposite said one side.

3. The wireless earbud as defined in claim 2, further comprising an electromagnetic shielding element which is provided between the third circuit board and the main and antenna circuit boards.

4. The wireless earbud as defined in claim 2, wherein the main circuit board is provided between the antenna circuit board and said one side of the rechargeable battery.

5. The wireless earbud as defined in claim 2, wherein the layers of the spatially folded circuit board assembly are parallel to each other and orthogonal to a center axis of the circuit board assembly, and wherein the loudspeaker is connected to the circuit board assembly and arranged in a longitudinal main direction at an angle ($\alpha'$) to the center axis of the circuit board assembly, and
 wherein the earbud housing comprises first and second housing parts having respective center axes, an angle ($\alpha$) between the center axes of the first and second housing parts being equal to the angle ($\alpha'$) of the longitudinal main direction of the loudspeaker with respect to the center axis of the circuit board assembly.

6. The wireless earbud as defined in claim 5, further comprising a near-field magnetic coil connected to the circuit board assembly and arranged in a longitudinal main direction parallel to the center axis of the circuit board assembly.

7. The wireless earbud as defined in claim 6, wherein the near-field magnetic coil is adapted for use as a T coil in hearing aid applications.

8. A wireless earbud for in-ear use, comprising:
 an earbud housing;
 a loudspeaker;
 a rechargeable battery;
 accelerometer/gyro circuitry configured to provide a signal indicative of an orientation of the wireless earbud in three dimensions;
 functionality for determining, based on the signal from the accelerometer/gyro circuitry, whether the wireless earbud is worn by the user as a right earbud or a left earbud; and
 functionality to feed the loudspeaker with right-channel stereo audio if it has been determined that the wireless earbud is worn by the user as a right earbud, and with left-channel stereo audio if it has been determined that the wireless earbud is worn by the user as a left earbud.

9. A storage and charging capsule for use with first and second wireless earbuds, the storage and charging capsule comprising:
 an elongate insert part having an earbud chamber adapted to receive each wireless earbud;
 a cover part for slidably receiving the elongate insert part, the cover part being placeable in an open position in which the cover part is retracted from the elongate insert part to allow insertion/removal of each wireless earbud into/from the earbud chamber of the elongate insert part, and the cover part being placeable in a closed position in which it encapsulates the elongate insert part;
 a power source; and
 a magnetic connector interface being provided in the earbud chamber of the elongate insert part, being connected to the power source and being adapted to engage with a respective at least one charge pad of each wireless earbud so as to secure each earbud in the earbud chamber and allow charging thereof by the power source;
 the storage and charging capsule further comprising a base part, wherein:
 the elongate insert part has a first end and a second end, the first end being connected to the base part, the earbud chamber being formed in a first section of the elongate insert part between the first and second ends, the earbud chamber having an earbud support element being shaped and adapted to receive the first and second wireless earbuds arranged one after another along a longitudinal major axis of the elongate insert part in first and second earbud compartments, respectively, of the earbud support element;
 the cover part being tubular and having a first end and a second end, the first end being adapted for slidably receiving the elongate insert part and the first end abutting against the base part in the closed position of the cover part; and
 said magnetic connector interface comprising:
  a first pair of magnetic connectors provided in the first earbud compartment, connected to the power source and being adapted to engage with a pair of charge pads of the first wireless earbud so as to secure the first wireless earbud in the first earbud compartment and allow charging of the first wireless earbud by the power source; and
  a second pair of magnetic connectors provided in the second earbud compartment, connected to the power source and being adapted to engage with a pair of charge pads of the second wireless earbud so as to secure the second wireless earbud in the second earbud compartment and allow charging of the second wireless earbud by the power source.

10. The storage and charging capsule as defined in claim 9, wherein the power source comprises a rechargeable battery.

11. The storage and charging capsule as defined in claim 10, wherein the rechargeable battery is accommodated in a second section of the elongate insert part.

12. The storage and charging capsule as defined in claim 10, further comprising a charging interface for the rechargeable battery, the charging interface being accessible for a user at the base part.

13. The storage and charging capsule as defined in claim 10, further comprising a status indicator adapted to provide an indication of an estimated remaining number of rechargings of the first and second wireless earbuds that the rechargeable battery is capable of before being recharged itself.

14. The storage and charging capsule as defined in claim 13, further comprising:
a sensor arrangement to detect when the cover part is in its closed position encapsulating the elongate insert part; and
auto-indication functionality, responsive to said sensor arrangement and adapted to cause the status indicator to provide the indication of the estimated remaining number of rechargings when the cover part is retracted from its closed position.

15. The storage and charging capsule as defined in claim 14, wherein the sensor arrangement comprises:
a conductive cushion provided at the second end of the cover part; and
circuitry provided at the second end of the elongate insert part and configured to detect a short circuit caused by electric contact with the conductive cushion when the second end of the cover part is positioned at the second end of the elongate insert part.

16. The storage and charging capsule as defined in claim 14, further comprising:
auto-standby functionality, responsive to said sensor arrangement and adapted to cause the storage and charging capsule to enter a standby mode when the cover part is brought to its closed position.

17. A storage and charging capsule for at least one wireless earbud, the storage and charging capsule comprising:
an elongate insert part having an earbud chamber adapted to receive the at least one wireless earbud;
a cover part for slidably receiving the elongate insert part, the cover part being placeable in an open position in which the cover part is retracted from the elongate insert part to allow insertion/removal of the at least one wireless earbud into/from the earbud chamber of the elongate insert part, and the cover part being placeable in a closed position in which it encapsulates the elongate insert part;
a power source comprising a rechargeable battery; and
a status indicator adapted to provide an indication of an estimated remaining number of rechargings of the at least one wireless earbud that the rechargeable battery is capable of before being recharged itself;
a sensor arrangement to detect when the cover part is in its closed position encapsulating the elongate insert part; and
auto-indication functionality, responsive to said sensor arrangement and adapted to cause the status indicator to provide the indication of the estimated remaining number of rechargings when the cover part is retracted from its closed position.

18. The storage and charging capsule as defined in claim 17, further comprising a magnetic connector interface being provided in the earbud chamber of the elongate insert part, being connected to the power source and being adapted to engage with a respective at least one charge pad of the at least one earbud so as to secure the earbud in the earbud chamber and allow charging thereof by the power source.

19. The storage and charging capsule as defined in claim 17, the storage and charging capsule further comprising a base part, wherein:
the elongate insert part has a first end and a second end, the first end being connected to the base part, the earbud chamber being formed in a first section of the elongate insert part between the first and second ends, the earbud chamber having an earbud support element being shaped and adapted to receive the first and second wireless earbuds arranged one after another along a longitudinal major axis of the elongate insert part in first and second earbud compartments, respectively, of the earbud support element;
the cover part is tubular and has a first end and a second end, the first end being adapted for slidably receiving the elongate insert part, and the first end abutting against the base part in the closed position of the cover part; and
the sensor arrangement comprises:
a conductive cushion provided at the second end of the cover part; and
circuitry provided at the second end of the elongate insert part and configured to detect a short circuit caused by electric contact with the conductive cushion when the second end of the cover part is positioned at the second end of the elongate insert part.

20. The storage and charging capsule as defined in claim 17, further comprising:
auto-standby functionality, responsive to said sensor arrangement and adapted to cause the storage and charging capsule to enter a standby mode when the cover part is brought to its closed position.

21. The wireless earbud as defined in claim 1, further comprising:
accelerometer/gyro circuitry configured to provide a signal indicative of an orientation of the wireless earbud in three dimensions; and
functionality for determining, based on the signal from the accelerometer/gyro circuitry, whether the wireless earbud is worn by the user as a right earbud or a left earbud.

22. The wireless earbud of claim 1 wherein the magnetic material is steel.

23. The wireless earbud of claim 1 wherein the magnetic material is gold-plated steel.

24. The wireless earbud of claim 2 wherein the magnetic material is steel.

25. The wireless earbud of claim 2 wherein the magnetic material is gold-plated steel.

* * * * *